Jan. 14, 1958
M. S. ROUSH
2,819,515
METHOD OF MAKING A BLADE
Filed June 26, 1951
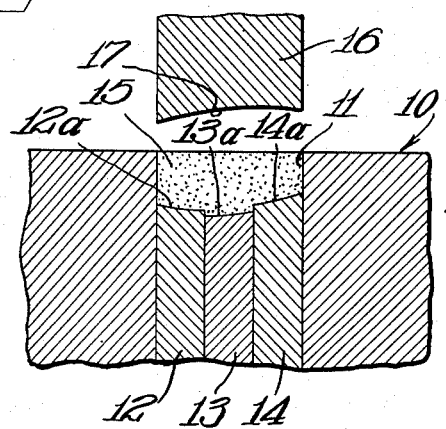
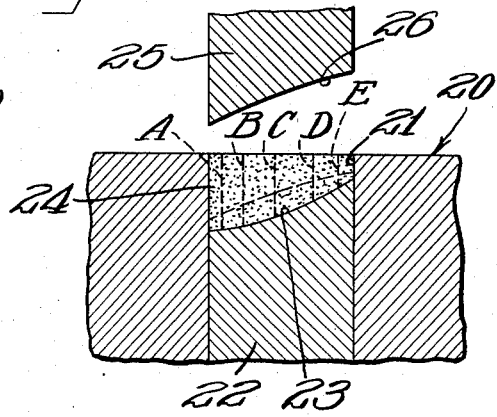
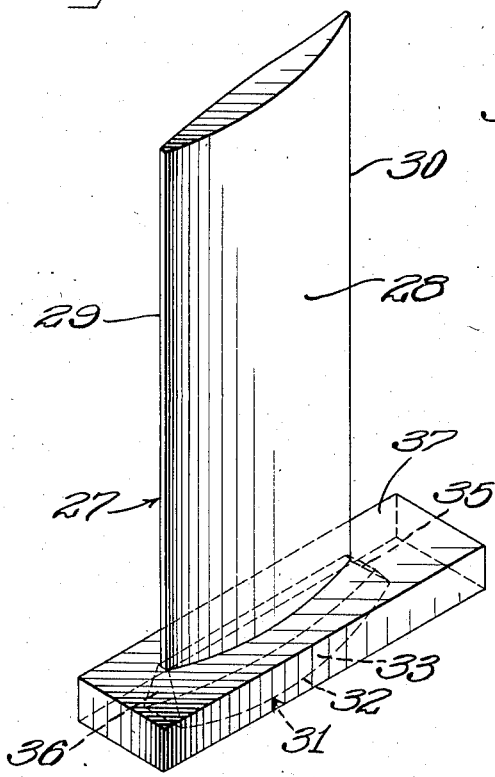
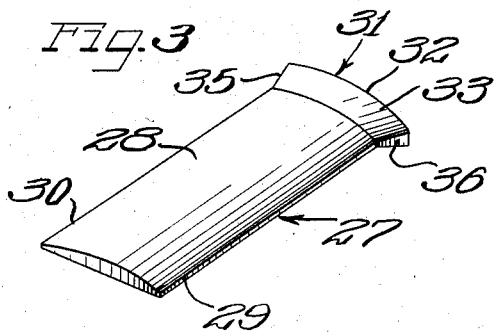
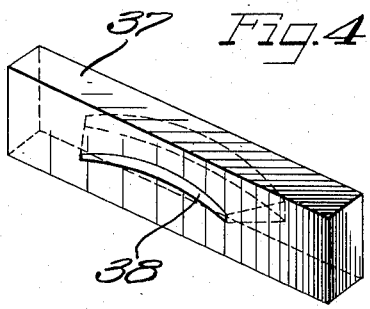
Inventor:
Milton S. Roush
by Hill, Sherman, Meroni, Gross & Simpson Attys United States Patent Office 2,819,515
Patented Jan. 14, 1958

2,819,515

METHOD OF MAKING A BLADE

Milton S. Roush, Painesville, Ohio, assignor to Thompson Products, Inc., Cleveland, Ohio, a corporation of Ohio Application June 26, 1951, Serial No. 233,545

4 Claims. (Cl. 29—156.8)

The present invention is concerned with a method for making fluid directing members, particularly blades for jet engine compressors.

The present invention is particularly concerned with the manufacture of fluid directing members which include a relatively large root section joined to a relatively thin, twisted airfoil portion. The manufacture of such fluid directing members by processes now in use ordinarily requires the provision of complicated molding die sets and relatively slow, hydraulically operated presses because of the large variation in the cross section of the airfoil portion and the variation in the cross section between the airfoil portion and the root.

In general, the present invention is concerned with a process in which an airfoil component and a root portion are separately fabricated from powdered metal. One of the features of the present invention resides in the punch assembly used in fabricating the airfoil component, the punch assembly being so designed as to distribute the metal powder in the mold in accordance with the thickness of the airfoil to be achieved at any given point, thereby producing a twisted, arcuate airfoil component of substantially uniform density throughout its length.

Subsequently, the airfoil component and the root component are joined by means of interengaging surfaces on the root and airfoil components. The two components are then bonded together into an integral, coherent structure as by infiltration with a relatively low melting point metal or alloy.

An object of the present invention is to provide a rapid method for fabricating powdered metal articles of complex shape.

Another object of the present invention is to provide an improved method for manufacturing powdered metal root equipped fluid directing members having a uniform density throughout the root and foil or fluid directing portions thereof by forming a foil compact with a wedge end and a root compact with a wedge receiving hole, inserting the foil through the hole to seat the wedge end and uniting the parts together by infiltration of a bonding metal.

Another object of the present invention is to provide a method of manufacturing a powdered metal jet engine compressor blade having a foil section with a greater twist in relation to the root portion than was heretofore considered possible through the use of conventional powder metallurgy techniques.

Another object of the present invention is to provide an improved type of compressor blade for a jet turbine engine.

A further description of the present invention will be made in connection with the attached sheet of drawings in which:

Figure 1 is a fragmentary cross-sectional view with parts in elevation of a three-piece punch assembly commonly used in the manufacture of arcuately shaped airfoil portions of compressor blades;

Figure 2 is a fragmentary cross-sectional view of the improved punch assembly of the present invention;

Figure 3 is a perspective view of an airfoil component produced according to the present invention;

Figure 4 is a perspective view of the root component produced according to the process of the present invention; and Figure 5 is a view in perspective of the assembled blade produced in accordance with the present invention.

Root equipped compressor blades for jet turbine engines conventionally have a thick root at one end of an airfoil portion which has relatively thin leading and trailing edges, and a thicker, arcuately shaped central portion. When fabricating such blades from powdered metal it is difficult to obtain proper distribution of powder to produce a blade having the correct contour and a substantially uniform density. One assembly which has been previously used in an attempt to secure such results is illustrated in Figure 1 wherein reference numeral 10 denotes generally a molding die having a recessed molding cavity 11 bottomed by three separately movable punch elements 12, 13 and 14 having arcuate surfaces 12a, 13a and 14a, respectively. Each of the punch elements 12, 13 and 14 is normally biased as by means of a spring or other loading means (not shown) so that in the uncompressed position illustrated in Figure 1, the central punch member 13 is disposed at a level slightly below the two outer punch elements 12 and 14.

A charge of powdered metal 15, which is commonly iron powder of a fine particle size, is introduced into the molding cavity 11 to a point approximately flush with the top surface of the die 10. Ordinarily, the height of the level of the powder 15 will be about three times the final thickness of the airfoil component to be produced.

The assembly of Figure 1 also includes an upper punch member 16 having an arcuately shaped active end surface 17 arranged to be snugly received within the molding cavity 11.

Upon initial movement of the upper punch member 16, the punch 16 enters the molding cavity 11, and the powder 15 is compressed against the spring biased lower punch members 12, 13 and 14. Since the amount of powder above the punches 12 and 14 is less than that above the central punch member 13, the punches 12 and 14 will travel downwardly a greater distance than will the central punch member 13. Eventually, all of the punch members 12 through 14 will be sufficiently depressed so that their upper surfaces, 12a, 13a and 14a, respectively, will define a smooth contour at the base of the mold of the cavity 11. Thus, effectively more powder is present in the central portion of the molded blade, above the central punch member 13.

The use of the assembly of the type illustrated in Figure 1 is somewhat limited due to the fact that complicated molding die sets are required, and slow hydraulic presses must be employed. Furthermore, the assembly shown in Figure 1 is limited with respect to the amount of twisting which can be achieved in an airfoil component. For example, it is difficult if not impossible by the use of the assembly of Figure 1 to make a metal blade of a design having a large root structure and a highly twisted airfoil section.

The improved punch assembly of the present invention is illustrated in Figure 2 of the drawings. In that assembly, the lower airfoil punch member is made in one piece rather than the three pieces illustrated in Figure 1, and so shaped that it is on a sufficient angle from the horizontal that the powder fill will always be about three times that of the finished section dimension at any point.

As illustrated in Figure 2, the improved punch assembly of the present invention includes the molding die 20, with a recessed molding cavity 21 formed therein. The lower punch member which defines the bottom surface of the molding cavity 21 is a single punch element 22 having an inclined, arcuately shaped upper surface 23 whose contour is the same as the contour of one surface of the airfoil component of the blade to be manufactured.

The molding cavity 21 is filled with metal powder 24 to a height in a ratio of about 3 to 1 to the thickness to be achieved in the finished airfoil component. Upon distributing the powder 24 in the molding cavity 21, however, the initial distribution of the powder will not be at the optimum ratio of 3 to 1. For example, in the portion of the molding cavity having the greatest depth of powder, illustrated by the letter "A" on the drawings, the fill ratio may be as high as 4 to 1. In an intermediate portion of the molded cavity, illustrated by letter "B," the fill ratio may be the optimum value of 3 to 1. In the central portion of the molding cavity 21, i. e., where the finished compressor blade is to have its maximum thickness, the fill ratio may be less than 3 to 1. This area is indicated generally by the letter "C" in Figure 2. In the portions of the molding cavity which are to define the trailing edge of the compressor blade, indicated by letters D and E of the drawings, the fill ratio will be approximately 3 to 1, the optimum value.

The upper punch member of the assembly shown in Figure 2 includes a punch element 25 having an inclined arcuately shaped compression surface 26 at a considerable angle to the horizontal. As shown in Figure 2, the leading edge 26 of this punch element is arranged to strike the powder 24 first upon the initial compression of the upper punch 25 into the molding cavity 21. Upon such initial compression, the compression surface 26 of the upper punch 25 and the upper surface 23 of the lower punch 22 cooperate to move excess powder, such as that occurring in region A over to an area, such as area C where the ratio of the fill height to the ultimate thickness is less than the optimum value. In this way, the powder in the molding cavity is distributed in accordance with the thickness to be achieved in the article, and with the result that an airfoil component of substantially uniform density is produced. In order to shape a wedge end on the airfoil section being compacted one end of the surfaces 23 and 26 is beveled or tapered to form a wedge shaped cavity therebetween. To form tapered end walls on the wedge end of the compact the side walls at one end of the die cavity 21 are bevel grooved.

From a comparison of the punch elements of Figure 2 with those of Figure 1, it will be evident that the compression surfaces of the punch elements of Figure 2 are at a substantially greater angle to the horizontal than are the molding surfaces of Figure 1. This forms an important feature of the present invention, as the inclined punch elements of Figure 2 cooperate upon relative movement of the punch elements during the compression stroke to distribute the powder being molded in the mold cavity. The cooperating similarly inclined surfaces of the punch elements provide a lateral component of force during compression which shifts powder from the edge of the cavity toward the center, where the greatest thickness of the compact is desired.

The use of the punch assembly in Figure 2 has the advantage that the complicated molding die sets of the type illustrated in Figure 1 are eliminated in favor of a die and punch assembly having only a single upper and a single lower punch. This feature enables one to manufacture the powdered metal airfoil compact on high speed mechanical presses rather than resorting to substantially slower hydraulic presses commonly used with the type of assembly shown in Figure 1.

The shape of the airfoil component produced in the punch assembly of Figure 1 is illustrated in perspective in Figure 3. As shown in that drawing, the airfoil component 27 includes an arcuately shaped airfoil section 28 provided with a relatively thin leading edge 29 and a thinner trailing edge 30. The airfoil component and compressor blade are molded separately in the process of the present invention. To provide for engagement of the airfoil component with the root component, the airfoil component 27 is provided with a wedge base portion 31 of generally trapezoidal shape. The base portion includes a bottom edge 32, a pair of converging sidewall portions 33 extending from the bottom edge 32 into the airfoil section 28. A pair of oppositely disposed outwardly tapered ends 35 and 36 define the edge portions of the base portion 31.

As illustrated in Figure 4, the root component of the present invention includes a rectangular shaped root portion 37 of the same shape as the root to be manufactured. The root portion 37 is provided with a wedge hole or inwardly tapered passageway 38 extending therethrough to receive the base portion 31 of the airfoil component 27.

The root and airfoil powdered metal compacts are pressed at relatively high pressures of from 10 to 50 tons per sq. in. and are self sustaining components.

Prior to assembly of the airfoil component with the root component, both of the powdered metal compacts are sintered by heating to temperatures of about 900° C. to 1100° C. in an inert atmosphere of hydrogen or cracked ammonia.

The sintering operation leaves the components in the form of relatively strong units which are still substantially porous. After the sintering operation, both the airfoil component and the root component are coined separately. During this operation, the base portion 31 of the airfoil component 27 is coined to the exact taper of the passageway 38 provided in the root component 37.

Following the sintering and the coining, the assembly is then completed by inserting the airfoil component 27 through the passageway 38 of the root portion 37, so that the base portion 31 is snugly received within the tapered passageway 38 of the root portion. If desired, the base portion 31 of the airfoil component can be made just slightly larger than the dimensions of the passageway 38, so that the two components can be joined together by means of a press fit.

After the initial assembly, the assembled components are then bonded together. Preferably, this bonding is carried out by infiltrating the porous compacts with a metal having a melting point below the metal of the root component and the airfoil component. In a preferred embodiment of the invention, the sintered iron assembled components are infiltrated with copper, or copper alloys containing at least about 90% copper. The impregnation can be carried out by immersing the assembled portions into a bath of molten copper, or by placing a slug of copper metal over the compact, and heating the assembly in a furnace to a temperature sufficient to melt the copper and cause diffusion of the molten copper into the pores of compact. During such diffusion, the molten copper is soaked up by the porous compact and the infiltrant metal effectively brazes the two components together into an integral, bonded structure having exceptionally high strength at the junction of the root and airfoil.

From the foregoing, it will be appreciated that the present invention provides a convenient method for manufacturing arcuately shaped articles where constant density is to be achieved. Furthermore, compressor blades made according to the present invention can be manufactured with larger angular twists of the airfoil in relation to the root than by the use of presently employed methods.

In addition, in the practice of the present invention, the molding can be done by means of mechanical high speed presses, and with the use of simplified molding tools. Furthermore, complicated root sections can be molded closer to size than is presently possible with the techniques now in use.

The practice of the present invention also has the advantage that it eliminates the possibility of cracks at the airfoil-root junction which commonly occur in using present molding and coining techniques. Even more important, the process of the present invention enables the production of a blade with a very small radius at the airfoil-root junction. Small radii at this junction are extremely desirable from an aerodynamic standpoint.

It will be understood that modifications and variations may be effected without departing from the scope of the novel concepts of the present invention.

I claim as my invention:

1. The method of making a fluid directing member having an anchoring root portion and a vane extending therefrom which comprises compacting powdered metal into vane shape including an arcuately shaped foil portion and an outwardly tapered base portion, separately compacting powdered metal into root shape with an inwardly tapered elongated aperture extending therethrough inserting said foil portion through the aperture in said root portion, seating the base portion of the vane in said tapered aperture in tightly fitting engagement, and joining said portions into an integral member by infiltration with a metal having a melting point below the melting point of the metal of said portions.

2. The method of making a fluid directing member having a root portion and an airfoil portion which comprises compacting powdered metal into the shape of an airfoil component including an arcuately shaped foil portion and an outwardly tapered base portion, compacting powdered metal into root shape having an inwardly tapered elongated aperture extending therethrough sintering the compacts to produce porous sized components inserting said foil portion through the aperture in said root portion until said base portion is firmly bottomed in said tapered aperture in tightly fitting engagement, and infiltrating the assembled portions with a metal having a melting point below the melting point of the metal of said portions to bond said portions together.

3. The method of making a gas turbine engine blade or the like member having an anchoring root portion on one end and a foil portion extending from the root portion, which comprises compacting powdered metal between angled surfaces, exerting powder distributing lateral forces on the powder to produce a uniformly dense compact with a twisted arcuately shaped thick centered thin edge foil portion and an outwardly tapered base portion, separately compacting powdered metal into a porous root portion having an inwardly tapered elongated aperture therethrough from metal powder, sintering said compacts, coining said compacts, inserting said foil portion through the aperture in said root portion with the edges of said base portion bottomed within said tapered aperture, and infiltrating the assembled portions with an infiltrant metal having a melting point below the melting point of the metal of said assembled portions to bond said portions together.

4. The method of making a gas turbine engine blade or the like from powdered metal which comprises filling a die cavity with powdered metal, bottoming the powder metal charge on an inclined surface, leveling off the powder to produce a charge in the die having an inclined bottom surface and a flat top, engaging the flat top of the charge with an inclined surface sloped in the same general direction as the inclined bottom, relatively moving said surfaces in a direction normal to the flat top of the charge to decrease the distance between said surfaces and compact the powder therebetween, simultaneously distributing the powder in lateral directions under the influence of force components acting on the powder due to the inclination of the surfaces to produce a foil member having a substantially uniform density and including an outwardly tapered base portion, compacting powdered metal into a root portion having an inwardly tapered elongated aperture therethrough, sintering the compacts to produce porous rigid components, inserting said foil member through the aperture in said root portion until said base portion is firmly bottomed within said tapered aperture, and bonding said foil member and said root portion together.

References Cited in the file of this patent

UNITED STATES PATENTS

| | | |
|---|---|---|
| 1,255,469 | Schlieder | Feb. 5, 1918 |
| 1,603,966 | Lorenzen | Oct. 19, 1926 |
| 1,671,953 | Gilson | May 29, 1928 |
| 1,905,944 | Lorenzen | Apr. 25, 1933 |
| 1,932,278 | Lacy | Oct. 24, 1933 |
| 2,063,706 | Soderberg | Dec. 8, 1936 |
| 2,298,885 | Hull | Oct. 13, 1942 |
| 2,350,125 | Dahlstrand | May 30, 1944 |
| 2,401,483 | Hensel et al. | June 4, 1946 |
| 2,431,660 | Gaudenzi | Nov. 25, 1947 |
| 2,456,779 | Goetzel | Dec. 21, 1948 |
| 2,581,252 | Goetzel | Jan. 1, 1952 |
| 2,633,628 | Bartlett | Apr. 7, 1953 |
| 2,637,671 | Pavitt | May 5, 1953 |
| 2,673,709 | Barnes | Mar. 30, 1954 |
| 2,719,095 | Scanlan | Sept. 27, 1905 |

FOREIGN PATENTS

| | | |
|---|---|---|
| 375,059 | France | May 2, 1906 |